May 26, 1970  R. F. PELLERIN ET AL  3,513,690
METHOD AND APPARATUS FOR NON-DESTRUCTIVE TESTING OF BEAMS
Filed Aug. 18, 1967  3 Sheets-Sheet 1
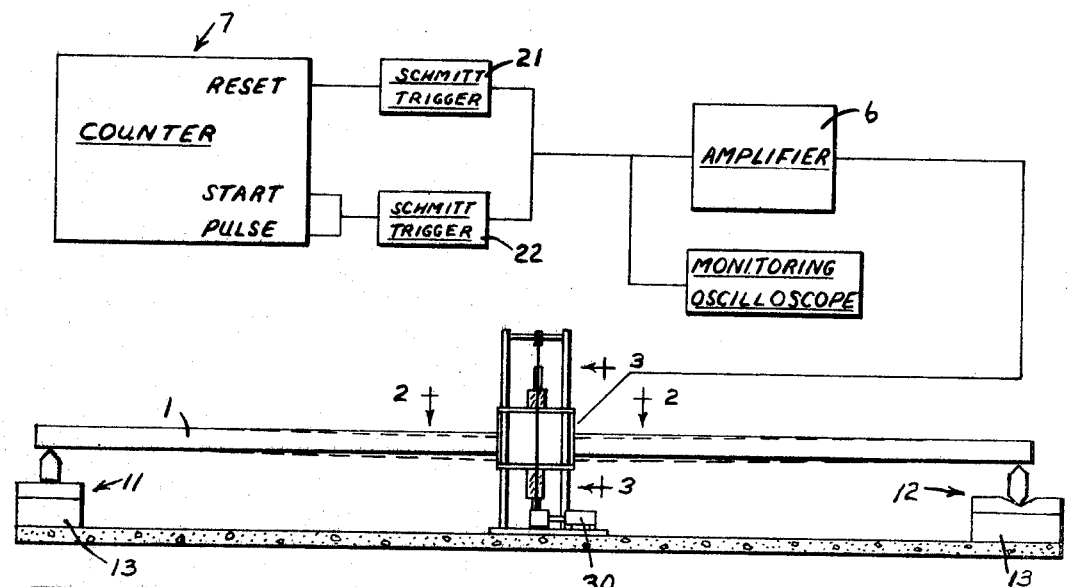
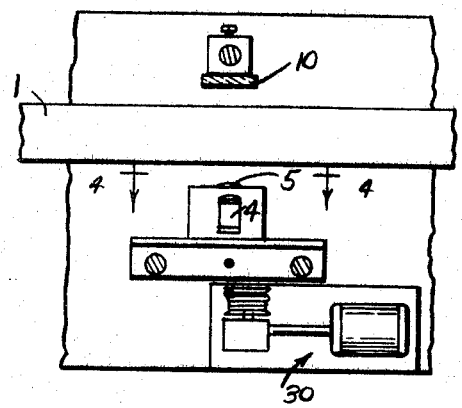
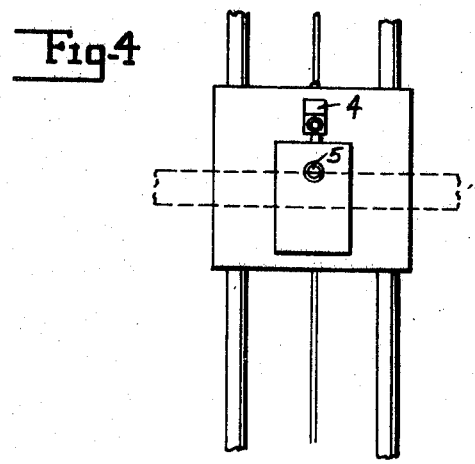
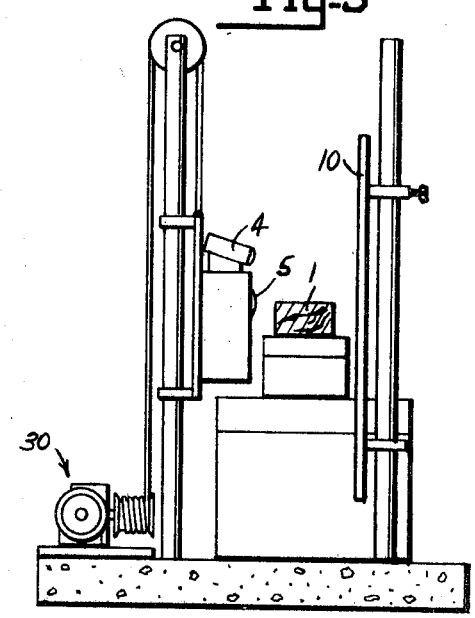
INVENTORS.
ROY F. PELLERIN
JAMES D. LOGAN
BY
Wells & St. John
Attys.

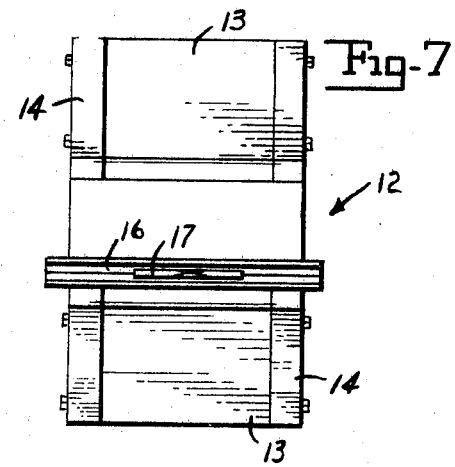
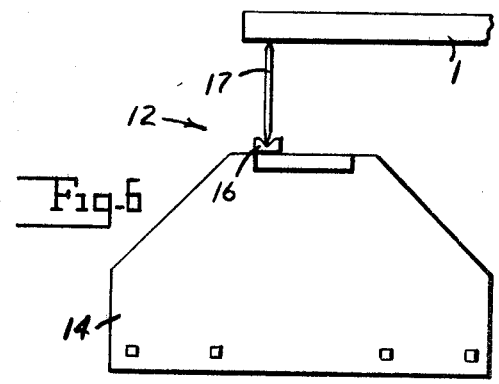
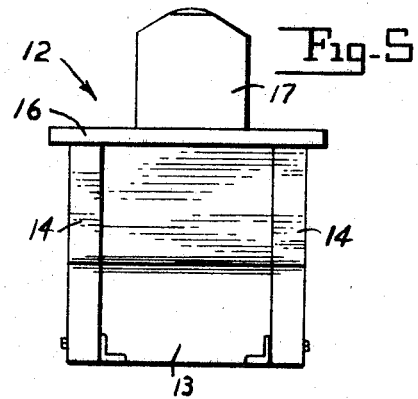
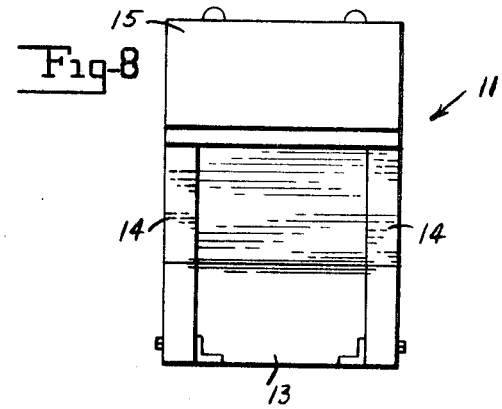
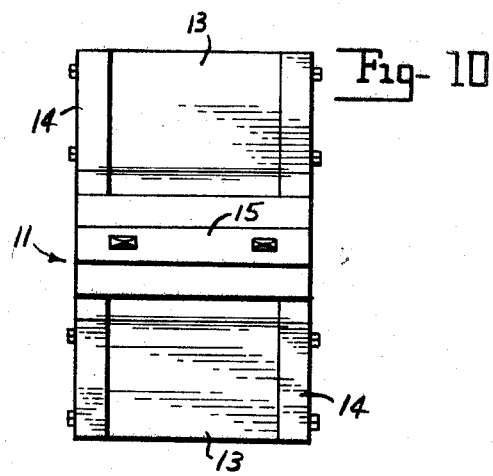
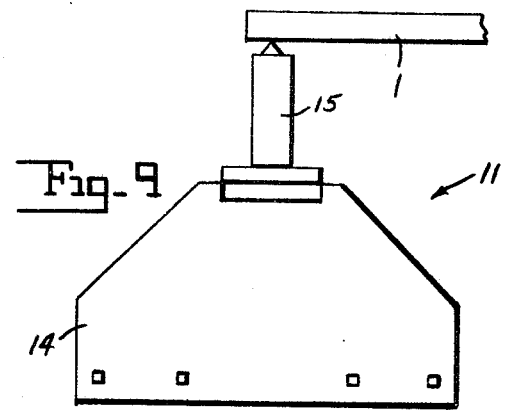

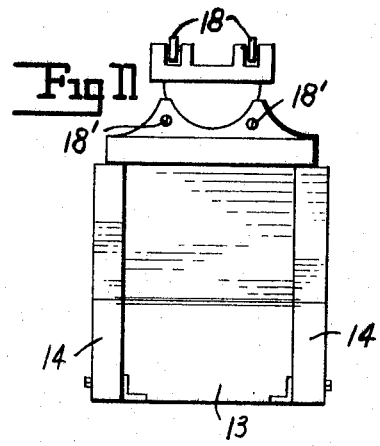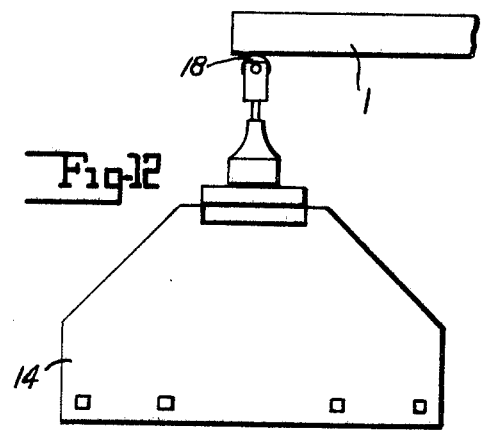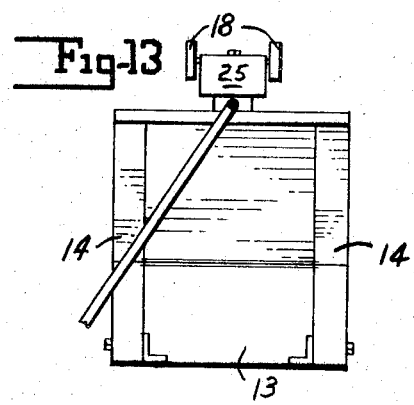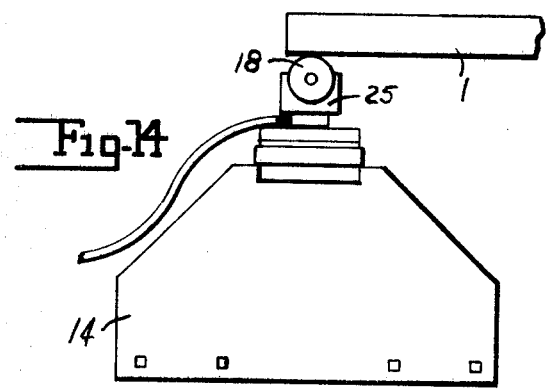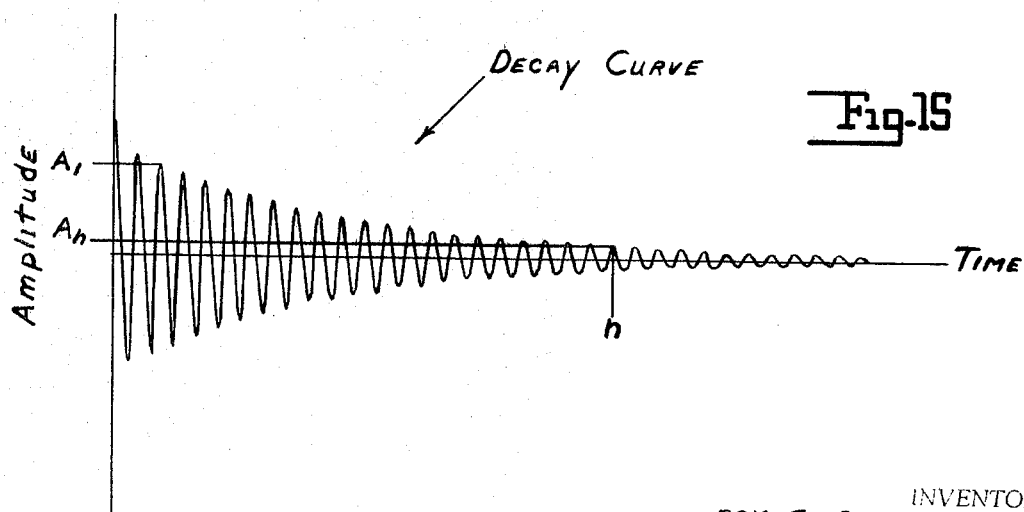

United States Patent Office 3,513,690
Patented May 26, 1970

3,513,690
METHOD AND APPARATUS FOR NON-DESTRUCTIVE TESTING OF BEAMS
Roy F. Pellerin and James D. Logan, Pullman, Wash., assignors to Washington State University Research Foundation, Pullman, Wash.
Filed Aug. 18, 1967, Ser. No. 661,576
Int. Cl. G01m 7/00
U.S. Cl. 73—67                                6 Claims

ABSTRACT OF THE DISCLOSURE

A method and apparatus are disclosed for non-destructive testing of beams. The method involves the imparting of free vibration to a supported beam and the subsequent measurement of the frequency of the vibration and rate of decay of the vibrational movement. These monitored values can then be related to the modulus of elasticity and the modulus of rupture of the beam. The apparatus utilizes unique support devices and vibration monitoring means to provide high efficiency and accuracy in the disclosed method. The supports particularly enhance the freedom of vibration necessary for reproducible results.

BACKGROUND OF THE INVENTION

This invention relates to a non-destructive test for determining the design properties of beams, particularly structural lumber. The special virtue of this method is that it enables the assignment of individual strength and individual elasticity values independently for each commercially usable piece. This independence leads to a high level of accuracy for strength determinations. The vibration approach is based on low-stress oscillations which permit measurement of two fundamental properties of materials, namely, energy storage and energy dissipation. It has previously been hypothesized that these fundamental properties might be related to the same mechanisms that control the mechanical properties, modulus of elasticity and modulus of rupture, respectively.

The outward manifestation of energy storage of a material under free vibration is its frequency, and measurement of the latter leads to a direct calculation of elasticity by known mathematical formulae.

The outward manifestations of energy dissipation in a material under free vibration is the rate of decay of the vibrations. In contrast to energy storage, however, the mathematical relationship involving energy dissipation and modulus of rupture have not been established. However, the prior hypothesis of a casual relationship between these values indicated the possibility of developing a system by which energy dissipation might be made to predict modulus of rupture.

Thus, the problem was first to develop a means of measuring energy dissipation on large commercial members, and second, to develop correlative information sufficient to provide the existence of a useful relationship. The method devised and disclosed herein involves the use of free transverse vibration of the member being tested. Energy dissipation is measured as the rate of vibrational decay or logarithmic decrement of the vibrations in the body.

The relationship between these vibrational parameters and mechanical properties of lumber have been previously investigated by several researchers, all of whom agree on the relationship of frequency to elasticity, but have conflicting conclusions concerning the usefulness of logarithmic decrement in predicting modulus of rupture. Prior publications by other researchers in this field indicate no usable relationship between logarithmic decrement and rupture. The key to the useful application of frequency and logarithmic decrement as set out herein relates to the quality of measurement provided by the method and apparatus described. By the use of this method and apparatus, correlation coefficients of 0.98 and higher have been achieved between dynamic and static elasticity. More significantly, however, correlation coefficients as high as 0.92 between vibration parameters and modulus of rupture have been achieved. This result can be attributed to the utilization of equipment and procedures as set out in detail below.

OBJECT OF THE INVENTION

This invention relates to a method and means for measuring vibrational parameters which reflect energy storage and energy dissipation in a vibrating beam. The invention is embodied in the equipment for measuring these parameters and the method of converting them into predictions of the mechanical properties of the beam.

Another object of this invention is to provide an apparatus capable of grading lumber, lumber products, and other beam-like structural materials for elastic modulus, rupture modulus, and other strength properties.

Segregation of material can be done as a step subsequent to this invention through automation by electronically conditioning the measurements of vibrational parameters and other factors to control grade-categorizing equipment.

BRIEF DESCRIPTION OF THE DRAWINGS

FIG. 1 is a schematic view of the apparatus and circuitry utilized herein;
FIG. 2 is a sectional view taken at an enlarged scale along line 2—2 in FIG. 1;
FIG. 3 is an enlarged sectional view taken along line 3—3 in FIG. 1;
FIG. 4 is an enlarged sectional view taken along line 4—4 in FIG. 2;
FIG. 5 is an end view of a first support;
FIG. 6 is a side view of the support shown in FIG. 5;
FIG. 7 is a top view of the support shown in FIG. 5;
FIG. 8 is an end view of a second support apparatus;
FIG. 9 is a side view of the apparatus shown in FIG 8;
FIG. 10 is a top view of the apparatus shown in FIG. 8;
FIG. 11 is an end view of another support structure;
FIG. 12 is a side view of the support structure shown in FIG. 11;
FIG. 13 is an end view of another support structure modification including a transducer mechanism;
FIG. 14 is a side view of the support structure shown in FIG. 13; and
FIG. 15 is a graph illustrating the rate of decay of vibrations in a beam.

DESCRIPTION OF THE PREFERRED EMBODIMENT

The vibrational parameters measured by the apparatus are: (1) the natural frequency of vibration, an indication of energy storage, and (2) the rate of decay of free vibration, a measure of energy dissipation. Prior art has shown the theory of the relationship of vibrational parameters to modulus of elasticity. This invention uses a statistical correlation to shown the relationship of vibrational parameters to other design properties including modulus of rupture.

Although the measurement of both parameters with the equipment shown in FIG. 1 involves some circuitry common to both, the operation of each measurement will be discussed separately.

Measurement of the natural frequency

The natural frequency of the beam is measured by this apparatus according to the following description.

Referring to FIG. 1, the beam 1 is supported adjacent to its extreme ends thus resulting in a mode of vibration with nodes at the ends. The beam is then energized by means of a momentary impulse whereupon it assumes a fundamental frequency of vibration which hereinafter will be called its natural frequency.

The oscillations of the beam are monitored by a suitable non-damping type transducer. FIGS. 1-4 show a vibration detector which consists of a direct-current light source 4 and a photo cell 5. The light source 4 emits a collimated light beam which is reflected across the beam from a mirror 10 with the beam blocking off about one-half of the light beam. The transition line of the light beam to shadow is then focused on the sensitive portion of photo cell 5. The motor drive 30 allows adjustment of the light and photo cell 5 assembly. The oscillations of the vibrating beam cause a variation in the amount of the light beam that strikes the photo cell 5. The photo cell 5 then converts the fluctuations of the light beam into an electrical signal. The voltage of the electrical signal generated is a function of the amount of light striking photo cell 5. Since the generated voltage of the photo cell 5 is relatively small, the electrical signal is passed through an amplifier 6 where the voltage is amplified to a usable level for subsequent operations. The remaining step for measurement of frequency is a counter 7 which is gated to count the impulses generated by the beam for a set length of time or which is capable of displaying time elapsed between impulses. The time elapsed between impulses is the vibration period or the reciprocal of frequency. Such counters are well known and may be purchased on the commercial market, as for example, the Universal EPUT and Timer Model 7360U of Beckman Instruments, Incorporated.

Factors influencing the natural frequency of vibration of rectangular beams are seen from examining the following equation:

$$f_n = c\sqrt{\frac{E_d I G}{W L^3}} \quad (1)$$

where:
$f_n$ = natural frequency, cycles per second
$c$ = constant, dependent on mode of vibration
$E_d$ = dynamic modulus of elasticity, lbs./in.$^2$
$I$ = sectional moment of inertia, in.$^4$
$G$ = gravitational force, 386 in./sec.$^2$
$W$ = weight of beam, lbs.
$L$ = length of beam, inches All of the terms for Equation 1 are either known constants or easily measured quantities except for the terms $f_n$ and $E_d$. Since a capability of this invention is to measure natural frequency ($f_n$), Equation 1 may then be solved directly for $E_d$. The elastic modulus determined by this procedure is referred to as a dynamic modulus of elasticity ($E_d$) and is equated to the static elastic modulus ($E_s$) by the following relationship:

$$E_s = K E_d \quad (2)$$

The term K in Equation 2 is the proportionality constant which must be found by a statistical correlation between $E_d$ and $E_s$ in which the latter is determined by conventional testing procedures.

Measurement of rate of decay

In free vibrations the rate at which the amplitude of vibration decays is a measure of energy dissipation. The rate of decay is commonly called logarithmic decrement ($\delta$). The factors influencing logarithmic decrement are seen from examining the following equation:

$$\delta = \frac{1}{n} \ln \frac{A_1}{A_n} \quad (3)$$

where:

$\delta$ = logarithmic decrement
$n$ = number of cycles
$\ln$ = natural logarithum
$A_1$ = amplitude of first cycle
$A_n$ = amplitude of $n^{th}$ cycle FIG. 15 shows a damped sine wave representative of vibrational decay in a beam, with the above terms noted. The precision with which $\delta$ may be determined is dependent upon the accuracy with which the amplitudes $A_1$ and $A_n$ are measured. It should also be noted that in the case of the vibrations of an actual beam, the rate of decay is a measure of all causes of energy dissipation, commonly called damping. These causes of damping include energy losses due to friction within the beam itself, energy losses due to friction within the support system, and energy losses to the air. Damping is also affected, usually unpredictably, by extraneous sources of vibration and these must therefore be eliminated or minimized. Since this invention is primarily concerned with the measurement of the energy losses within the beam itself, the other causes of damping must either be isolated or minimized.

Referring to FIG. 1, the beam to be tested is placed on supports involving stationary bases 11, 12 which are constructed so as not to respond to vibrations in the frequency range of the beam under test. We have found that one workable form of base consists of a block of lead 13 on each side of which is fastened a thick alumininum plate 14, to which the actual beam support is attached. It is common practice to support the beam by means of firm knife edges. We have found that an improved method of support is to replace one of the firm knife edges with a support which will permit horizontal longitudinal freedom. This arrangement greatly reduces the tendency of the support to dampen the free vibration of the beam and results in the internal friction of the beam being a proportionately larger contributor to the total damping.

More specifically, various supports usable in the present method and apparatus are illustrated in FIGS. 5 to 12. One support 11 is a rigid stationary knife edge support, while the remaining support 12 provides the desirable longitudinal movement at the respective beam end. The support 11 is illustrated in detail in FIGS. 8 to 10. It includes an outwardly directed rigid plate 15 terminating in two transversely spaced knife edge portions that actually contact the beam along a transverse line.

Several versions of the support 12 are shown. The first is illustrated in FIGS. 5-7. It includes a transverse grooved member 16 carried by the base and supporting a double knife edge plate 17. The plate 17 has a wide base that fits within the groove of member 16 in a transverse position parallel to the line of contact of the plate 15 with a beam. Its upper end terminates in a rounded knife edge to provide generally point contact with a beam and a lateral location between the points of contacts of the beam by plate 15 at the opposite end of the beam. This provides three point contact which accommodates twist and other types of warp prevalent in lumber.

The movable knife edge on support 12 might also be a flexible spring member with a lower end anchored to the supporting base, its outer end being free to flex with beam movement.

Another successful type of support which allows longitudinal freedom comprises rollers 18, either as a single roller or in a double unit as shown in FIGS. 11 and 12. The rollers permit the segment length between the supports to change with oscillation while the chord length remains constant. Rollers 18 in the double unit can be angularly tilted upon release of locking screws 18' to accommodate warp.

The beam is set into vibrational motion by any means which will not dampen the subsequent vibrations of the beam. In the laboratory, the beam has been set in motion by tapping with a finger. This suggests that a variety of methods may be used, such as dropping the beam a short distance onto the supports, or by any other momentary impulse. The resulting vibration of the beam is known as "free" vibration in contrast to "forced" vibrations commonly induced by means of mechanical coupling to a prime mover, or a fluctuating air column impinging on the surface of the beam.

The precise measurement of the natural frequency of vibration forms one part of the invention as described in the previous section on measurement of energy storage. The rate at which the vibration dies out, or decays, leads to the logarithmic decrement, the measurement of which forms the second part of the invention described in the following paragraphs.

The electrical signals used to operate the measurement circuit are initiated by the vibrating beam by means of a non-damping type pickup as described in the previous section on measurement of energy storage.

The signal from photocell 5, of relatively low voltage, is next fed into an amplifier 6 where the voltage is amplified to a usable level for subsequent operations. The signal then enters a triggering circuit which forms an amplitude discriminator. We have found that two Schmitt triggers work well in this function. The Schmitt trigger 21 is set to trigger at amplitude $A_1$, and actuates the reset function of the counter. The Schmitt trigger 22 is set to trigger at an amplitude $A_n$ and actuates the start function of the counter. The counter then accumulates one count per input pulse to the start gate, provided that it is not reset by an input pulse from the other Schmitt trigger 21. The counter then counts and displays the number of pulses which occur between amplitudes $A_1$ and $A_n$.

The trigger levels of the Schmitt triggers 21, 22 may be set so that the natural logarithm of the ratio of $A_1$ to $A_n$ in Equation 3 is equal to unity. The number of pulses displayed on the counter is then the reciprocal of $\delta$ (Equation 3). If the natural logarithm of the ratio of $A_1$ to $A_n$ is not set to unity, the value would be applied as a correction factor.

Another method of measuring $\delta$ would be to fix the number of cycles ($n$) and measure the amplitudes of $A_1$ and $A_n$. In this case the measurement time could be reduced by choosing a small $n$ and measuring $A_1$ and $A_n$.

As the vibrational sinusoid of the beam decays, three conditions occur in the logic circuitry in sequence: (1) the input signal voltage exceeds or equals the upper trip-points of both Schmitt triggers, then (2) the signal input voltage exceeds the upper trip-point voltage of the START Schmitt trigger, but not of the RESET Schmitt trigger, then (3) the signal input voltage does not reach the upper trip point of either Schmitt trigger.

When the signal from amplifier 6 is greater than the upper trip-point of the RESET Schmitt trigger 21, the counter 7 gets a RESET input. The RESET signal in the counter has priority, and the count remains at zero.

When the signal from amplifier 6 is lower than the upper trip-point of the RESET Schmitt trigger 21, but greater than the upper trip-point of the START Schmitt trigger 22, the counter 7 gets a pulse input and counts whatever comes into the pulse input terminal of the counter. The number of accumulated counts is displayed as they are accumulated.

When the signal finally drops below the upper trip point of the START Schmitt trigger 22 the counter gets no inputs, and holds the count it has accumulated.

Prediction of strength properties

We have shown through statistical correlation that both $E_d$ and $\delta$ are related to modulus of rupture (R). We have also shown that a higher degree of correlation results from a combination of $E_d$ and $\delta$. Prior art has shown the relationship of density ($\rho$) to R and is therefore represented in the general equation for R which follows:

$$R = K\rho^a E_d^b \delta^c \qquad (4)$$

where:

R = modulus of rupture
$\rho$ = density
$E_d$ = dynamic modulus of elasticity
$\delta$ = logarithmic decrement
K = proportionality constant The exponents $a$, $b$, and $c$ are dependent on population variations due to species, dimensions, moisture content, etc. Any other strength property can be predicted through the use of the same Equation 4.

In our experiments, we took representative samples of a population of wood beams and examined them both nondestructively by vibration and destructively for modulus of rupture by standard tests. The data from these samples were then analyzed by statistical correlation to determine the relationship between vibrational parameters and the static mechanical properties for the population involved. Thereafter, any beam from the population could be tested nondestructively and its modulus of rupture predicted within a useful range of accuracy. This procedure is necessary in arriving at values of modulus of rupture for any other population of beams.

In the cases where automation is desired, such as an automatic grading apparatus, special purpose computing circuits may be programmed to solve Equations 2 and 4 and control grading stamps as required.

The high degree of correlation between R and vibrational parameters of structural lumber which we have achieved is attributed to the precision with which the apparatus as described in this invention measures the parameters of the freely decaying vibrations in beams.

Alternative structures

As illustrated in FIGS. 13 and 14 the transducer can be incorporated in one of the supports. FIGS. 13 and 14 show such an arrangement, using beam-contacting rollers 18 and a transducer 25 interposed between the rollers 18 and the supporting base structure. The transducer 25 is a force transducer, the output from such a device being fed into a suitable amplifier having an output voltage proportional to the force in the support. Regardless of the type of vibration detecting device utilized, a linear relationship must be achieved between the vibration monitored and the signal fed to the associated electronic circuitry.

Other detection components which have proven feasible include a capacitance pickup and a microwave pickup. In the case of the capacitance pickup, when the plates of a capacitor are moved relative to one another, the capacitance developed across the plates will be a function of their separation. A displacement-sensitive transducer utilizing these principles can be readily envisioned with the beam under test either carrying a capacitor plate or the wood substance itself acting as a capacitor plate. In the case of a microwave detection scheme, the wooden beam is used as a vibrating reflector of the microwaves, and a horn antenna is directed to the surface to be observed. The detection unit measures the amplitude and the phase of the reflected microwave signal and feeds out a voltage that is a function of the particular amplitude and phase. This voltage can be adjusted to have a linear relationship to the instantaneous displacement of the vibrating beam. The microwave equipment has the added advantage of being capable of measuring the moisture content of the beam when combined with available accessory equipment.

Having thus described our invention, we claim:

1. An apparatus for non-destructive testing of wood structural beams comprising:
    a reference framework;
    first and second longitudinally spaced support means mounted to said framework for transversely ingaging the lower surface of a horizontal beam being tested along two parallel lines at locations adjacent the respective longitudinal ends thereof;

mounting means interposed between each of said support means and said framework for preventing damping of vibration in the beam due to causes external to the beam;

one of said support means being movably mounted on said framework for permitting unrestricted translational motion of the beam at the line engaged thereby relative to said framework in a longitudinal direction only;

the remaining support means being substantially fixed relative to said framework for preventing translational movement of the beam at the line engaged thereby;

said beam being free of physical contact by any additional external means capable of damping vibration within the beam other than said engagement of said first and second support means;

means for initiating free transverse vibration of the beam while engaged by the first and second support means by momentarily subjecting the beam to a physical impulse; and transducer means for producing an electrical signal instantaneously proportional and linearly related to the amplitude of vibration of the beam as induced by said impulse.

2. The apparatus as set out in claim 1 wherein said one support means comprises:
a stationary base;
an upright beam supporting member mounted on said base, said member terminating in an upwardly directed knife edge, said member being movably carried on said base in such fashion that the upwardly directed knife edge thereof is free to move longitudinally with the beam at the line engaged thereby.

3. The apparatus as set out in claim 1 wherein said one support means comprises:
a stationary base:
a beam supporting roller or rollers tangentially engaging the beam and rotatably mounted on said base about a transverse axis for rotational movement about said axis in response to longitudinal movement of the beam at the line engaged thereby.

4. The apparatus as set out in claim 1 wherein said one support means comprises:
a stationary base;
an upright beam-supporting transverse plate of flexible spring material having its lower edge fixedly mounted on said base and terminating in an upwardly directed transverse knife edge that is free to move longitudinally with the beam at the line engaged thereby.

5. The apparatus set out in claim 1 wherein said support means contact the beam at two transverse locations adjacent to one beam end and at a single transverse location adjacent the remaining beam end.

6. In a method of non-destructive testing of a wood beam, the steps comprising:
supporting the lower surface of the beam at one end along a stationary transverse line;
supporting the lower surface of the beam at its remaining end along a transverse line free to move longitudinally due to vibration of the beam;
subjecting the supported beam to a momentary mechanical impulse to initiate free vibration of the beam perpendicular to its lines of support; and
monitoring the free vibration induced within the beam by the impulse.

References Cited

UNITED STATES PATENTS

| 1,543,124 | 6/1925 | Ricker | 73—67.2 |
| 2,439,219 | 4/1948 | O'Connor. | |
| 2,486,984 | 11/1949 | Rowe | 73—67.2 |
| 2,706,400 | 4/1955 | Unholtz | 73—71.6 |

FOREIGN PATENTS

| 171,624 | 10/1965 | U.S.S.R. |

OTHER REFERENCES

William L. Galugan et al., "Nondestructive Testing Of Structural Lumber," Material Evaluation, April 1964, pp. 169–174, 73–67.

Roy F. Pellerin, "A Vibrational Approach To ... Nondestructive Testing Of Structural Luber," Forest Products Journal, vol. XV, No. 3, March 1965, pp. 93–101, 73–67.

RICHARD C. QUEISSER, Primary Examiner

A. E. KORKOSZ, Assistant Examiner